United States Patent [19]

Woebkenberg, Jr. et al.

[11] Patent Number: 5,312,152
[45] Date of Patent: May 17, 1994

[54] SHAPE MEMORY METAL ACTUATED SEPARATION DEVICE

[75] Inventors: William H. Woebkenberg, Jr., Hatfield; Dominick A. DeAngelis, Newtown Square, both of Pa.

[73] Assignee: Martin Marietta Corporation, Princeton, N.J.

[21] Appl. No.: 781,473

[22] Filed: Oct. 23, 1991

[51] Int. Cl.$^5$ .......................... B25J 15/00; F03G 7/06
[52] U.S. Cl. ................................... 294/86.4; 60/528; 294/82.24; 294/82.3
[58] Field of Search .................. 294/1.1, 82.24, 82.26, 294/82.3, 82.36, 86.3, 86.4, 99.1, 100, 902, 906; 60/527-529; 149/402, 902, 907, 909; 244/158 R, 161; 279/74, 110, 121, 122; 403/28; 411/909; 901/30, 31, 36, 39

[56] References Cited

U.S. PATENT DOCUMENTS

| | | | |
|---|---|---|---|
| 2,994,933 | 8/1961 | Wolfe | 24/141 |
| 3,075,348 | 1/1963 | Baker | 60/528 |
| 3,450,372 | 6/1969 | De Lange et al. | 244/1 |
| 3,513,429 | 5/1970 | Helsop | 337/382 |
| 3,622,941 | 11/1971 | Wetmore | 339/98 |
| 3,753,792 | 8/1973 | Tyler | 148/402 X |
| 3,953,253 | 4/1976 | Clark | 148/402 X |
| 3,999,790 | 12/1976 | Rogen | 292/201 |
| 4,010,455 | 3/1977 | Stange | 340/224 |
| 4,019,925 | 4/1977 | Nenno et al. | 148/2 |
| 4,022,519 | 5/1977 | Hill | 339/30 |
| 4,031,704 | 6/1977 | Moore et al. | 60/527 X |
| 4,044,358 | 8/1977 | Manning et al. | 343/18 A |
| 4,149,911 | 4/1979 | Clabburn | 148/11.5 R |

(List continued on next page.)

FOREIGN PATENT DOCUMENTS

| | | | |
|---|---|---|---|
| 40246 | 2/1989 | Japan | 901/36 |
| 1144105 | 6/1989 | Japan | 148/402 |
| 216787 | 8/1989 | Japan | 294/86.4 |

OTHER PUBLICATIONS

Hi-Shear Corp/Ordnance Division, Product Line Data Sheets SL1016, SL1010, SL1013, SL1022, SN9400 series, SN700 series, SP series (No date).

L. H. McCarty (ed.), "Shape Memory Alloy Drives Rotary Actuator", Design News, Feb. 12, 1990, pp. 180-181 (No date).

Primary Examiner—Johnny D. Cherry
Attorney, Agent, or Firm—Clement A. Berard, Jr.; William H. Meise

[57] ABSTRACT

A shape memory alloy (SMA) actuator predeformed in tension actuates a separation device mechanism. A segmented nut, which engages a threaded bolt to be held and released, is held together by a nut retainer that is movable with respect to the nut and is affixed to the SMA element. The SMA element is heated by an electrical resistance heater to cause it to return to its undeformed state, thereby moving the retainer relative to the nut segments. When the retainer disengages from the segments, the segments are free to move outwardly thereby releasing the bolt or other item. Ones of the shape memory alloy actuator have a plurality of parallelly arranged SMA elements, every other one of which is predeformed in compression and intermediate ones of which are predeformed in tension. The elements are coupled end-to-end so that, when they are heated to cause them to return to their undeformed states, their respective elongations and shrinkages combine at the output to produce an actuation that is the cumulation in the same direction of the changes of all the elements. The plurality of elements may be in a side-by-side or concentric arrangement. Embodiments of the separation nut also include a plunger arrangement for urging the nut segments to move apart when released by the nut retainer and an ejector for pushing the released bolt or other item out of the separation device housing.

20 Claims, 2 Drawing Sheets

FOREIGN PATENT DOCUMENTS

| | | | |
|---|---|---|---|
| 4,198,081 | 4/1980 | Harrison et al. | 285/381 |
| 4,233,731 | 11/1980 | Clabburn et al. | 29/859 |
| 4,314,682 | 2/1982 | Barnett et al. | 244/158 R |
| 4,405,387 | 9/1983 | Albrecht et al. | 148/11.5 R |
| 4,412,872 | 11/1983 | Albrecht et al. | 148/11.5 F |
| 4,450,616 | 5/1984 | Morita | 29/446 |
| 4,497,241 | 2/1985 | Ohkata | 98/40.25 |
| 4,501,058 | 2/1985 | Schutzler | 29/446 |
| 4,531,988 | 7/1985 | Todoroki et al. | 148/402 |
| 4,553,393 | 11/1985 | Ruoff | 60/528 |
| 4,554,027 | 11/1985 | Tautzenberger et al. | 148/11.5 R |
| 4,559,512 | 12/1985 | Yaeger | 60/527 X |
| 4,586,335 | 5/1986 | Hosoda et al. | 60/528 |
| 4,617,448 | 10/1986 | Goldowsky | 219/200 |
| 4,619,568 | 10/1986 | Carstensen | 411/222 |
| 4,700,541 | 10/1987 | Gabriel et al. | 60/528 |
| 4,712,969 | 12/1987 | Kimura | 414/730 |
| 4,740,253 | 4/1988 | Simpson et al. | 148/11.5 R |
| 4,753,465 | 6/1988 | Dalby | 292/32 |
| 4,798,051 | 1/1989 | Foote | 60/527 |
| 4,836,496 | 6/1989 | Abujudom et al. | 251/11 |
| 4,899,543 | 2/1990 | Romanelli et al. | 60/527 |
| 4,900,078 | 2/1990 | Bloch | 294/86.4 |

SHAPE MEMORY METAL ACTUATED SEPARATION DEVICE

The present invention relates to shape memory metal actuated devices, and in particular to such devices adapted for retaining and releasing objects.

Every spacecraft mission requires the successful functioning of numerous one-time-operation mechanism components. These devices are used to retain, release and deploy instruments or other equipment which are secured to the spacecraft or launch vehicle structure during mission launch. A great deal of effort is required to ensure that these complex devices behave in a predictable manner. Generally, retention and release mechanism devices are actuated with pyrotechnic initiators which present problems such as safety, pyrotechnic shock, and contamination by the products of their firing. As spacecraft become increasingly complex, not only do they commonly require a larger number of such devices, but they are move susceptible to the adverse effects of these types of problems. For example, vehicles with optical instruments are extremely sensitive to contamination, and so may not be permitted to employ pyrotechnic devices. One solution has been the development of complex motorized latching mechanisms which present packaging and weight problems, as well as increased cost and complexity, and decreased dependability and reliability. The availability of simple, non-contaminating and passive mechanism elements would greatly reduce engineering test, engineering design and safety associated analysis.

The common pyrotechnic retention and release mechanisms devices, such as pin pullers, separation nuts and cable cutters, generate large transient shock loads which are transmitted to the spacecraft structure, both from the pyrotechnic initiator firing and from the sudden release of strain energy from the mated parts. In most cases, these shock loads are more sever than the vibratory acceleration loads generated by the launch vehicle during launch. A great deal of time and effort is required to analyze the effects of these loads because they are very difficult to predict. Often it is necessary to redesign or "beef up" spacecraft structures and instruments to accommodate them. At times the analysis is so complex that representative load characteristics are really not known until actual testing is performed. Such testing is expensive and hazardous, and the results are uncertain due to the variability among pyrotechnic initiators. Moreover, pyrotechnic devices cannot be tested directly so there is always uncertainty as to whether a particular device will operate when called upon.

The overall effect of using pyrotechnic retention/release devices, instead of using passive devices, results in heavier spacecraft. However, pyrotechnic devices are generally more compact, more reliable and lighter (mechanism only) than motorized latching schemes. Reliable, slow-releasing, non-pyrotechnic alternatives to pyrotechnic retention and release devices would greatly reduce the transient shocks generated upon actuation as well as reducing the cost and weight associated therewith.

Thus, there is a need for reliable, low-shock-generating, slow releasing, passive, compact, non-contaminating, simple and lightweight alternatives to pyrotechnic retention and release and deployment mechanism devices. It is further desired that such alternatives be repeatable and testable, as well as suitable for application to spacecraft and other remote equipment.

Accordingly, the apparatus for releasably grasping a workpiece of the present invention comprises a segmented grasping device having grasping features thereon with the segments thereof mounted in movable relationship for moving together for grasping features of the workpiece and for moving apart for releasing the workpiece. Engaging means are movable between first and second positions in relation to the segmented grasping device for respectively engaging the segments of the grasping device together when in the first position and disengaging the segments when in said second position. A member formed of a material that returns substantially to its undeformed state when heated to a predetermined temperature has a predetermined deformation from its undeformed state and is affixed at one of its locations to the mounting and at another of its locations to the engaging means. Heating means heats the member to the predetermined temperature for causing the member to return toward its undeformed state. This return tends to move the engaging means from one of the first and second positions to the other thereof.

Figure 1:
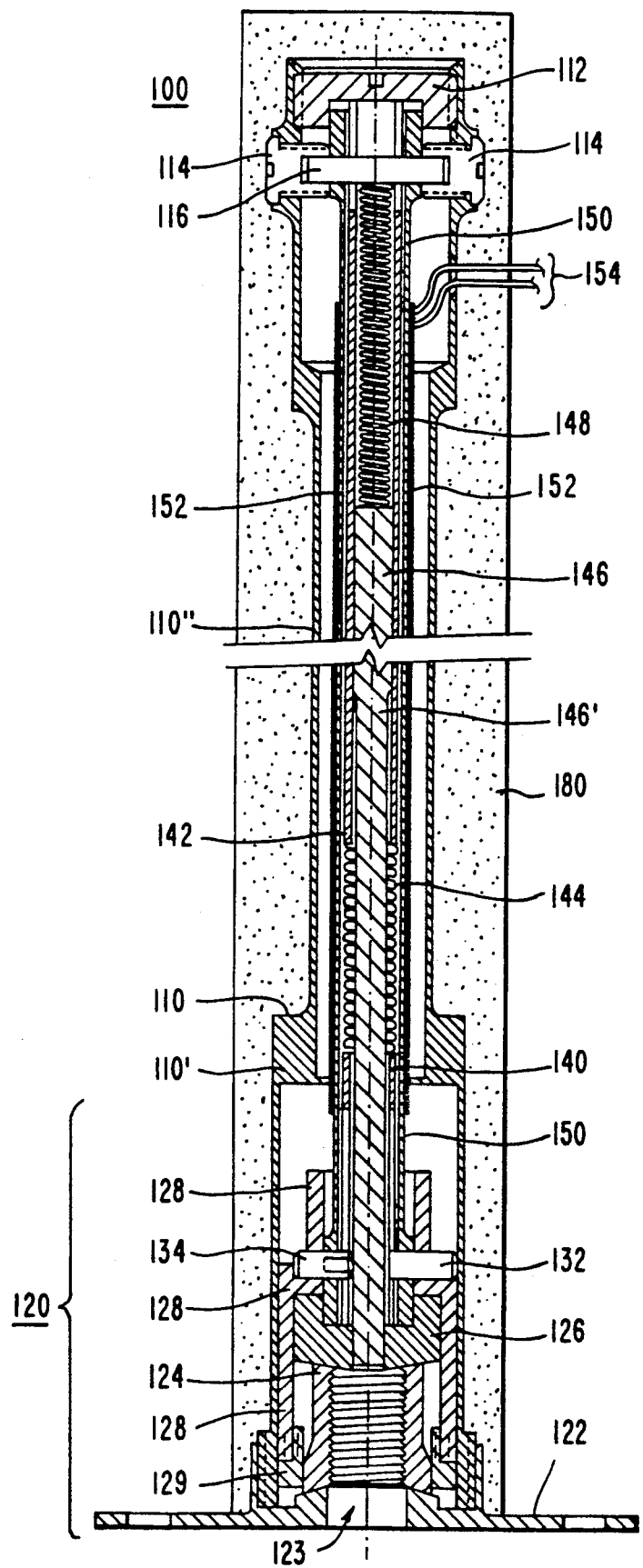
FIG. 1 is a diagram of an arrangement including the present invention.

Several alloys are known to exhibit shape memory properties. The shape memory metal alloy employed in the arrangements described herein is a nickel titanium alloy (NiTi or NiTiNOL) which, although expensive, possesses the most capability. NiTiNOL is a Nickel Titanium shape memory alloy believed to have been developed, in the early 1960's, at the Naval Ordnance Lab. SMA materials are available from Shape Memory Applications located in Sunnyvale, Calif. and from Furukawa Electric located in Tokyo, Japan. Shape memory alloys exhibit the property of "remembering" a preset or "stored" shape, even after the material is severely deformed into a different shape. The shape memory recovery is induced by the application of heat, such as from hot water or electrical heaters, and can be triggered at a preset temperature that is determined by the particular alloy composition. Transformation temperatures between $-100°$ C. and $+100°$ C. are possible. The rate at which the recovery can occur is limited by how fast heat can be applied.

For single cycle applications, i.e. one-time actuation, NiTiNOL can recover up to an 8% memory strain ($\delta L/L$) without significant residual strain. For applications involving a few cycles (for example, $<10$), a 5% memory strain is a reasonable design guideline, and for multiple cycle applications (up to 10 million), a 3% memory strain is a reasonable design guideline. To compare these strain values with typical engineering alloys, consider the following: A specimen of a typical steel alloy (ASTM-386) would begin yielding for strains greater than 0.12% (titanium *6al4v* 0.73%, aluminum *6061-T6*0.37%). For a 100° C. temperature change, a specimen of a typical steel alloy would elongate by about 0.12% of its length (titanium, 0.10%, aluminum 0.24%).

Typical engineering alloys work-harden and fatigue quickly under high cyclic stresses. In deformation, the atomic planes within the material are believed to slide over one another and establish a new crystal position. There is no means by which the material can "remember" where the atoms were before they moved, thus, the crystal can not exhibit "memory" properties. Also, as the metal is deforming the dislocations become increasingly tangled, causing work-hardening and damage to the crystalline order of the material.

In shape memory alloys, however, the deformation is permitted by changing the "tilt" of a twin orientation of crystals. However, this does not cause any dislocation motion. Instead, the crystal structure of the martensite (cold phase) forms by the shearing of the austenite lattice (hot phase). Upon heating, this permits only one crystalline direction that the martensite lattice can move in when restoring to the austenite structure. Therefore, the material will in its martensite (cold) phase "remember" or restore to the shape formed in its austenite (hot) phase. Because the shape memory recovery process does not damage the crystalline structure, a very high fatigue life can be obtained even under large strains and stresses.

The process utilized to "store" or preset a shape in a NiTiNOL SMA element is outlined below.

Step 1. Obtain the initial form of a SMA element, for example, a piece of straight rod or tube of predetermined length that is the desired stored shape (i.e. the shape to which it is desired that the element return when heated in use).

Step 2. Clamp the element to prevent distortion or motion during heat treatment.

Step 3. Heat treat (anneal) the clamped element in an oven at a temperature well above its transformation temperature, typically at 400° C. to 500° C. for up to one hour, in an inert atmosphere.

Step 4. Cool the clamped element back to a temperature which is below its transformation temperature, e.g., room temperature.

Step 5. Form the element into the desired shape by plastically deforming it, for example, elongate it to increase its length.

Thereafter, when the plastically deformed element is heated to a temperature above its transformation temperature, it will return to its undeformed state, i.e., the stored shape.

This process can be repeated many times on the same element without significant degradation. The "stored" shape need not be the same each time, however, the material will only "remember" the last "stored" shape; the previous shape is lost in the annealing process. NiTiNOL is also available with cryogenic transformation temperatures, and the above process will differ with respect to the temperatures employed.

When an SMA element is employed in apparatus such as that described herein, which may be required to be operated only a few times, it is satisfactory to repeat only step 5 of the process.

Reductions in weight and electrical power requirements for shape memory alloy elements can be achieved by optimizing the thermodynamic cycle of the shape memory metal in force, length and temperature space. For example, to achieve the same force output, one can select the cross-section of the SMA element and the power of the drive heaters in accordance with the higher transformation temperature created by the selected stress level. Also, an increased understanding of the behavioral characteristics of the SMA material will allow devices to operate with a lower margin of safety, thus, lighter mass elements can be used. For example, the SMA-actuated separation nut described herein generates about 500 pounds of force to free the segments of a segmented nut thereby to release a preloaded bolt, even though a 5/16 inch diameter bolt may be preloaded to 4,000 pounds (typical maximum). About 50 pounds of force is typically required to free those segments, thus, the margin of safety is about ten times. Since the SMA material possesses both a specific heat (0.32 J/gm-°C.) and a latent heat of transformation (21 J/gm) as do liquids such as water, larger element masses require greater energy levels for actuation (i.e. to convert from the martensite phase to the austenite phase). However, lower mass elements produce larger stress levels which in turn create higher stress-induced transformation temperatures, so optimization should be employed for element selection.

In addition, the SMA material possesses several peculiarities in its characteristics relative to compression and tension. For example, an exemplary SMA tube element (4" long, OD=0.412", ID=0.28") requires about 1,400 pounds of force to plastically elongate the tube by 0.16 inch (i.e. net deflection after the tensile load is removed). However, the same element requires about 10,000 pounds of force to plastically compress the tube by 0.16 inch (i.e. net deflection after the compressive load is removed). Also, whereas an absolute maximum of about 8% apparently exists for maximum recovery strain in tension, present experience suggests that 5% is about the maximum practicable recovery strain in compression, with very little residual strain.

In FIG. 1, separation device 100 comprises a tubular housing 110 having a larger diameter base housing portion 110' and an upper housing portion 110". Housing 110 may be fabricated as a single piece or as multiple pieces, for example, by providing a threaded connection near the shoulder where the diameter transitions from the larger diameter of base housing 110' to the smaller diameter of upper housing 110". Base housing 110' screws into threads on a cylindrical projection from mounting base 122. Base 122, housing 110' and the parts therein comprise a segmented nut mechanism 120 which is described in detail below. The top of upper housing 110" is closed off by end cap 112 threaded thereinto.

Upper tubular housing 110" includes in the bore thereof predeformed elongated shape memory alloy tube 150 that shrinks upon being heated to its transformation temperature thereby to actuate mechanism 120. Tubular housing 110 is encased in a thermal insulation material 180 to minimize the portion of the heat generated by electrical heaters 152 that is lost through the housing, thereby to cause a greater portion of the heat generated by heaters 152 to be absorbed by SMA tube 150 and raise its temperature toward the transformation temperature.

The structure of separation nut assembly 100 will be described in terms of three main functional groupings of parts: (1) the segmented nut mechanism and retainer with the SMA actuator, (2) the plunger arrangement and spreader in relation to the segmented nut, and (3) the bolt ejector mechanism.

Within base housing 110', segmented nut mechanism 120 comprises segmented nut 124 having three segments each of 120° of arc that when held adjacent to each other form threaded cavity 123 having internal threads therein. The ends of the segments of segmented nut 124 have concave conical bevels at angles corresponding to those of the convex conical bevel of base 122 and spreader 126, respectively. The three segments of nut 124 are confined radially so as to remain tightly adjacent to each other by the inner cylindrical surface of ring 129, and are confined axially by the respective conically bevelled surfaces of base 122 and spreader 126, so as to remain in alignment with each other.

Ring 129 is threaded into the internal threads on the larger diameter portion of segmented nut retainer 128, the smaller diameter portion of which is held in fixed relationship to the larger diameter lower portion of shaped memory alloy (SMA) tube 150 by large bottom pin 132 and small bottom pin 134. Ring 129 and retainer 128 may be fabricated as a single piece. SMA tube 150 is shown in its deformed unactuated, i.e. elongated, state. Tube 150 is heat annealed in the manner described above and then cooled to ambient temperature, and then is plastically elongated prior to being assembled into housing 110''. The upper larger diameter end of SMA tube 150 is fixed with respect to upper housing 110'' by top pin 116, the ends of which reside in recesses in the two pin caps 114 which are threaded into respective openings in upper tubular housing 100''. Two thermofoil electrical resistance heaters 152, having Kapton ® insulation and an aluminum foil backing, are placed against SMA tube 150. The two resistors 152 are held in place by an overwrap of Kapton ® heat shrinkable tape of type Shrink Band No. 4, Part No. EI-103, available from Minco Company of Minneapolis, Minn. The two thermofoil heaters, also available from Minco Company, are electrically wired in parallel and have a resistance selected to produce a total power of about 66 watts with 28 volts applied.

Electrical power is applied to the two heater resistors 152 via electrical wires 154 which pass through a hole in upper housing 110'' from whence they are connected to a source of electrical power.

When it is desired to actuate separation nut 100, electrical power is applied via wires 154 to heaters 152 thereby developing heat for raising the temperature of SMA tube 150 to above its transformation temperature. This causes SMA tube 150 to develop an internal stress tending to return tube 150 to its original length, i.e. shrink. Because the upper end of tube 150 is fixed with respect to housing 110 by top pin 116, the bottom end of SMA tube 150 moves in an upward direction away from base 122. This motion is transmitted directly to segmented nut retainer 128 which is fixedly held to tube 150 by bottom pins 132 and 134. This motion causes ring 129 to correspondingly move away from base 122 so that it comes to be located radially outwardly of the portion of segmented nut 124 having smaller outside diameter. As it moves it disengages from the segments of nut 124. In this condition the three segments of nut 124 are no longer held radially in adjacent contact with each other by ring 129 and are free to move in a radially outward direction.

Such motion is fostered by a plunger mechanism. Within the bore of SMA tube 150 a plunger mechanism includes top plunger tube 142 which has a pair of axial grooves cut in the upper end thereof permitting the tube to freely slide with respect to top pin 116 so that the end of top plunger tube 142 bears against end cap 112. The plunger mechanism also includes bottom plunger tube 140 which similarly has grooves therein for clearance of pins 132 and 134, whereby bottom plunger tube 140 is permitted to slidably move within the bore of SMA tube 150 and, if not restrained by spreader 126, to extend its bottom end substantially to the base 122. Plunger tube 140 is urged to move in a downward direction toward base 122 by plunger spring 144, the upper end of which bears against the bottom end of top plunger tube 142 and the bottom end of which bears against the top end of bottom plunger tube 140. As shown in FIG. 1, plunger spring 144 is compressed by spreader 126 holding bottom plunger tube 140 in the bore of SMA rod 150. The force generated by plunger spring 144 and transmitted via plunger tube 140 to spreader 126 creates forces in the three segments of segmented nut 124 which when acting via the conical bevels in base 122 and spreader 126 drive the segments of nut 124 in a radially outward direction toward the cylindrical walls of base housing 110'. This increases the diameter of the internal threads on the segments of segmented nut 124 and permits a bolt (not shown) previously threaded therein to disengage from the threads and be released, and to fall out of cavity 123 by gravity (in a downward direction in FIG. 1).

Separation nut 100 is not, however, always used where the SMA tube 150 is oriented in a vertical direction with the threaded cavity 123 down and the bolt threaded therein able to be removed by gravity. Such other conditions might occur, for example, if separation nut 100 is not vertically oriented or is used in an environment where there is an external force (such as centrifugal force) or no gravity, such as on a rocket, spacecraft or other space vehicle. In such case there is a need for a positive acting mechanism for ensuring that the bolt captured in threaded cavity 123 is ejected therefrom when released upon actuation of separation nut 100.

To this end, bolt ejector rod 146 is slidably mounted within the bores of top plunger tube 142, bottom plunger tube 140 and plunger spring 144. The upper end of bolt ejector rod 146 bears upon the bottom end of bolt ejector spring 148, the upper end of which bears against top pin 116, thereby to exert a force urging bolt ejector rod 146 to travel in a downward direction toward and at least as far as base 122. Ejector rod 146 is shown in FIG. 1 in a position as if a captured bolt were threaded into cavity 123 thereby compressing ejector spring 148. The lower end of ejector rod 146 has a smaller diameter portion 146'. The diameters of the larger and smaller diameter portions of ejector rod 146 are selected in conjunction with plunger spring 144 so that the diameter of the bore of plunger spring 144 is larger than the diameter of the smaller diameter portion of ejector rod 146 but is smaller than the diameter of the larger diameter portion thereof. Thus, ejector rod 146 is free to move in a direction toward base 122 until the transition between its smaller diameter portion 146' and the remainder thereof comes to bear upon the upper end of plunger spring 144. The length of the smaller diameter portion 146' is selected so that the lower end of ejector rod 146 is approximately at the plane of the planar mounting surface of base 122 when the ejector rod is fully extended.

In an exemplary embodiment of separation nut 100, SMA tube 150 consists of a nickel titanium shape memory alloy tube element that is 6.1 inches long, has an outside diameter of 0.412 inch at its ends and of 0.320 inch in its central portion and an inside diameter of 0.28 inch, with a pair of electrical surface heaters 152 wrapped on the outer surface thereof and dissipating a total of 66 watts. SMA tube element 150 is plastically elongated axially by about 0.26 inch which is about 4.3% of its length (net displacement after the tensile load is relieved), prior to being installed into housing 110. When raised to its transformation temperature, SMA tube 150 will shrink by 0.26 inch to its undeformed length with a capability to generate a force of about 500 pounds, In the exemplary embodiment the segments of segmented nut 124 and ring 129 are fabricated from 17-4 PH stainless steel.

Thermal insulation 180 preferably comprises a multilayer insulation system, for example, one having an outer layer of 2 mil Kapton ® film with an indium tin oxide coating on the outside surface and an electrodeposited aluminum coating on the surface facing toward housing 110. The intermediate ten layers are comprised of a Mylar ® or Dacron ® fabric mesh and the inner layer closest to housing 110 is a 1 mil thick Kapton ® sheet with electro-deposited aluminum thereon.

The actuation time, i.e. the time between application of the electrical power to heaters 152 and the segmented nut 124 releasing the captive bolt (not shown), is approximately 15 seconds at room temperature and increases to approximately 45 seconds in vacuum at a temperature of $-180°$ centigrade. It is noted that the phenomenon of shape memory transition is a function of energy (Joules), not of power (watts, where a watt equals a Joule per second), required to cause the dimensional transition in a given mass of SMA material. Therefore the actuation time is a function of the power generated in the selected heater and the mass of the SMA element with a smaller heater power corresponding to a proportionately longer actuation time. The thermal efficiency is improved, and the actuation time correspondingly reduced, when separation nut 100 is encased in thermal insulation as was the case of the exemplary embodiment described above.

In addition to the advantages set forth above for the SMA separation nut, other beneficial effects have been observed. The exemplary embodiment was designed to release a 5/16 inch diameter bolt which was under a 4,000 pound preload. Substantially all of the bolt preload was relieved before the bolt released, due to the relatively slow withdrawal of the segmented nut retainer 128 and ring 129 in a direction away from base 122 thereby allowing the segments of nut 124 to move radially outward slowly. Thus, the preload is gradually relieved with substantially no shock being induced. Furthermore, no debris is generated upon actuation, either from the SMA material or from the bolt. A further advantage is that following actuation, separation nut 100 may be disassembled and SMA rod 150 may be re-elongated and the separation nut 100 then reassembled, thereby permitting actual testing and reset of the components of separation nut 100 and its subsequent use without the addition of new and untested components or parts, as is the case with pyrotechnically actuated devices.

Figure 2:
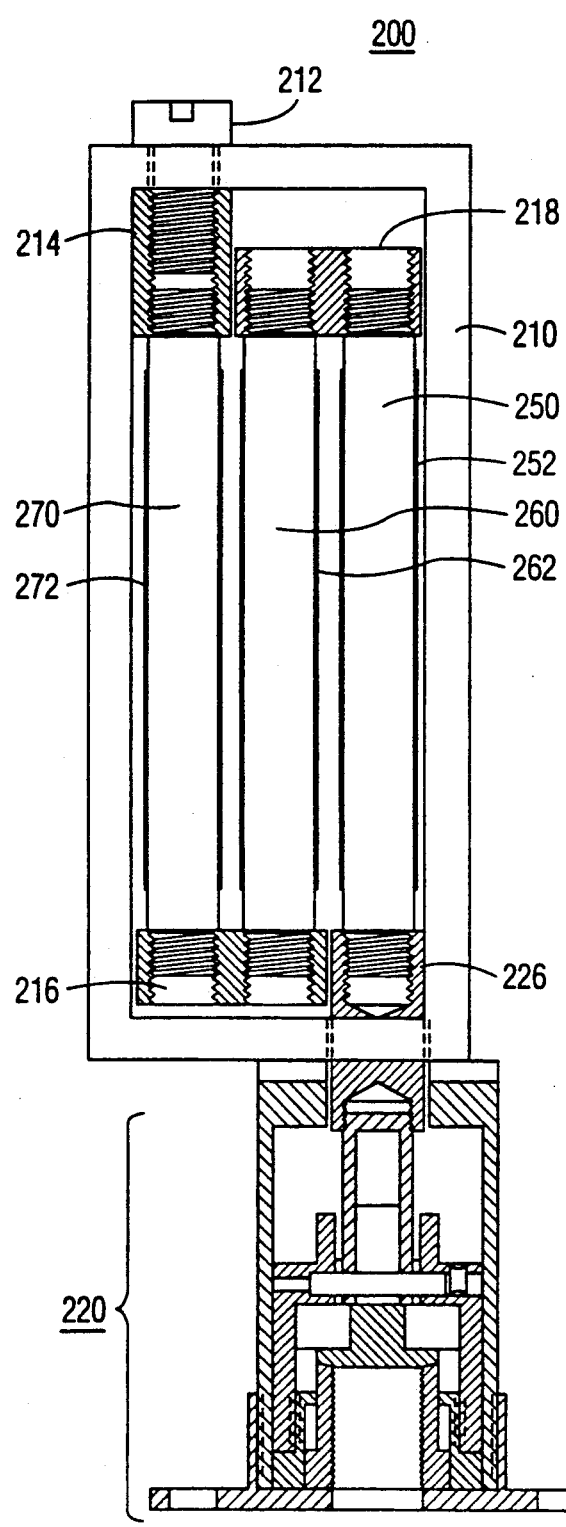
FIGS. 2 and 3 are diagrams of further actuating arrangements in accordance therewith.

In FIG. 2, separation nut assembly 200 employs a segmented nut mechanism 220 which is similar to that described above for mechanism 120, without a bolt ejector arrangement. Separation nut assembly 200 employs a compound parallel element SMA actuator including three SMA tubes 250, 260 and 270. Within housing 210, which may be made of one or more pieces, a first threaded end of SMA tube 270 is threaded into base coupling 214 which is fixedly held against the end of housing 210 by bolt 212. The second end of tube 270 is attached parallel to SMA tube 260 by means of both said tubes being screwed into parallel threaded holes in coupling joint 216. The threaded second end of tube 260 is attached to the threaded first end of tube 250 by both said tubes being screwed into parallel threaded holes in coupling joint 218. The threaded second end of SMA tube 250 is attached to a coupling pin 226 by being screwed into a threaded hole therein. Pin 226 is slidable in a direction parallel to the axis of rod 250 through a hole through the lower end wall of housing 210. Although pin 226 may, in fact, be a separate piece from the segmented nut retainer as shown in FIG. 2, such retainer may, if convenient, be simply and directly attached by screwing the threaded second end of SMA tube 250 into a threaded hole in the end of the retainer opposite the end having the retaining ring thereon.

In separation nut 200, SMA tubes 250 and 270 are predeformed so to be in an elongated state, whereas SMA tube 260 is predeformed to be in a compressed state. Two parallel heater resistors 252, 262 and 272 (each pair producing together about 66 watts) are mounted on each of SMA tubes 250, 260 and 270, respectively, using the same materials and mounting arrangement as described above in relation to FIG. 1. When these heaters are activated, the temperatures of tubes 250, 260 and 270 increase until they reach their transformation temperature at which point tube 270 shrinks, driving joint 216 in a direction to move coupling joint 216 and thus tube 260, joint 218, tube 250, pin 226 and the segmented nut retainer away from the base of the segmented nut mechanism 220. In like manner, SMA tube 260 which is compressed becomes elongated, thereby also moving joint 218, tube 250, pin 226 and the segmented nut retainer in the direction away from the base. Further, SMA tube 250 also shrinks further driving pin 226 and the segmented nut retainer in the direction away from the base. As a result, the segmented nut retainer moves away from the base a distance that is the sum of the shrinkage of tubes 250 and 270 plus the elongation of tube 260, developing a force at least as great as that generated by the weakest of tubes 250, 260 and 270.

In an exemplary embodiment according to FIG. 2, SMA tubes 250 and 270 are each 3.84 inches long and have an outside diameter of 0.412 inch, and an inside diameter of 0.28 inch, and are plastically elongated axially by 0.16 inch, i.e. 4.2% of their length (net displacement after the tensile load is relieved) prior to installation. Tube 260 is 4.17 inches long and has the same inside and outside diameters as do tubes 250 and 270 and is plastically compressed axially by 0.17 inch, also about 4.1% of its length (net displacement after the tension load is relieved). Upon heating, the compressed inner SMA tube element 260 elongates and the elongated outer SMA tube elements 250 and 270 will shrink, together creating a relative aggregate motion or stroke of about 0.5 inch for pin 226 with respect to the base joint 214. Separation nut 200 of FIG. 2 actuates at room temperature approximately 90 seconds after the application of electrical power to heaters 252, 262 and 272, and generates approximately 2,000 pounds of force. In vacuum at $-180°$ C., actuation time lengthens to approximately 150 seconds.

If the SMA tubes 250, 260 and 270 described in the previous paragraph are replaced by SMA rods of like diameter and length, and are elongated and compressed a like amount, separation nut 200 will also produce a 0.5 inch stroke at pin 226 but will have a capability of generating about 4,000 pounds of force.

In the component arrangement of SMA elements of FIG. 2, a plurality of SMA elements have alternating predeformation, i.e., every other element (250, 270) is predeformed in tension with intermediate elements (260) predeformed in compression. Elements 250, 260 and 270 are coupled together at their ends so that the relaxation of such predeformation accumulates upon actuation. Although three SMA elements 250, 260 and 270 comprise the component arrangement of FIG. 2, a greater or lesser number of elements may be employed, with alternating compression and tension predeformation throughout the progression of elements. The number may be even or odd.

Figure 3:
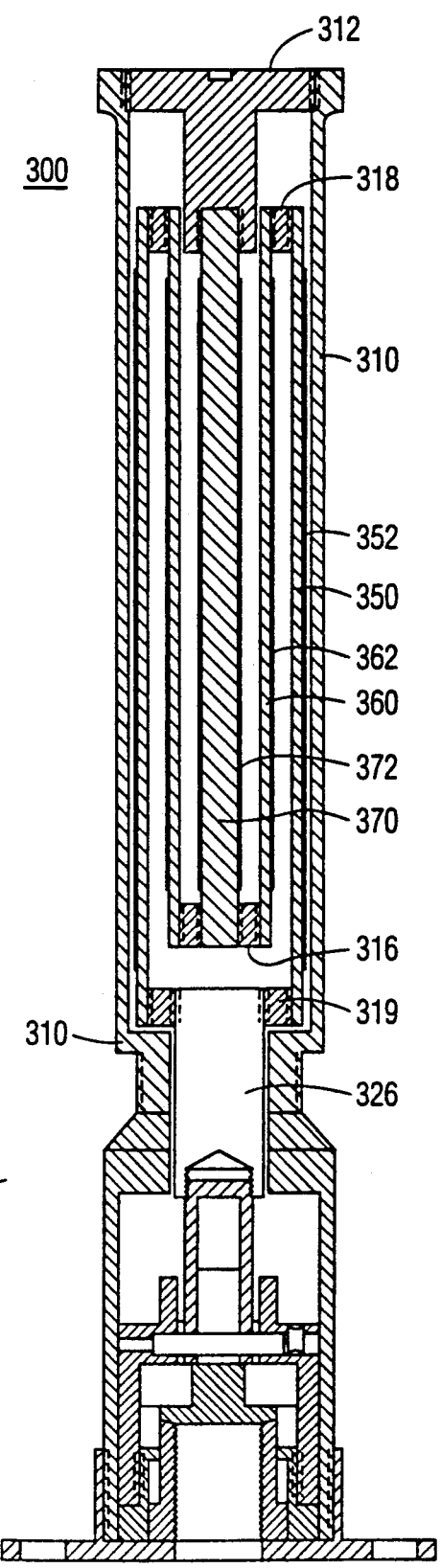

FIG. 3 is an alternative embodiment having compound SMA elements of alternating predeformation similar to those described in relation to FIG. 2. Separation nut 300 employs three concentric SMA elements 350, 360 and 370 to produce an aggregated action similar to that described for tubes 250, 260 and 270 of FIG. 2. Separation nut 300 includes a tubular housing 310 to which is attached a segmented nut mechanism 320 similar to that shown and described in relation to segmented nut mechanism 120 of FIG. 1, but without a bolt ejector arrangement. A first end of inner SMA rod 370 is threaded to be fixedly attached to the threaded hole in end cap 312 which is threaded to be screwed into the threaded end of housing 310. The threaded second end of rod 370 is screwed into the internal threads of coupling ring joint 316, the external threads of which are screwed onto the threaded first end of SMA tube 360. The threaded second end of SMA tube 360 is screwed into the internal threads of coupling ring joint 318, the external threads of which are screwed into the threaded first end of outer SMA tube 350. The threaded second end of outer SMA tube 350 is screwed via coupling ring joint 319 to coupling pin 326 which is attached to the segmented nut mechanism 320 in substantially the same manner as described above in relation to FIG. 2. Similarly to that described above, aluminum-foil-backed electrical resistance heaters 352, 362 and 372 are respectively bound to the outer surfaces of SMA tubes 350, 360 and SMA rod 370 using Kapton ® shrink tape as described above.

Inner SMA rod 370 and outer SMA tube 350 are each predeformed in tension and will shrink when their temperature is increased to the transformation temperature by the application of electrical energy to their respective resistance heaters. In like manner, inner SMA tube 360 is predeformed to be compressed and will elongate when raised to its transformation temperature.

As an exemplary embodiment of separation nut 300, if the effective lengths of tubes 350 and 360 and that of rod 370 are made the same as the lengths of corresponding elements 250, 260 and 270 of FIG. 2, and if they are respectively compressed and elongated in like amounts to that described in relation to FIG. 2, then the stroke at coupling pin 326 will also be about ⅛ inch. Further, if inner SMA rod 370 is 0.412 inch in diameter and the outside diameters and inside diameters of outer and inner tubes 350 and 360 are selected so that they each have the same cross-sectional area as that of rod 370, separation nut 300 will also have the capability of generating a force of up to about 2,000 pounds at coupling 326.

It should be understood that the housing 210 of separation nut 200 in FIG. 2 and the housing 310 of separation nut 300 in FIG. 3 are preferably encased in a thermal insulation material, such as that described above in relation to thermal insulation 180 of separation nut 100 of FIG. 1.

Various alternatives and modifications to the foregoing would be evident to one of skill in the art and are within the scope of the present invention which is limited only by the claims following. For example, the actuating arrangements of FIGS. 2 and 3 could be employed to activate mechanisms other than segmented nut mechanisms 220 and 320, such as separation nuts, pin pullers, valves, gear boxes and the like.

In separation nuts 200 and 300, SMA elements 250 and 370 may be fabricated from tubes rather than rods if it is desired to employ a bolt ejector of the sort described in relation to FIG. 1.

Alternative heating methods could be employed in place of the electrical resistance heaters described herein. Housings 110, 210 and 310 could be adapted within inlet and outlet orifices through which a heated fluid could be passed, thereby to raise the temperature of the SMA elements within such housings to their transformation temperature for actuating such arrangements. The fluid could be either a heated gas or a heated fluid such as a water or oil. In such instance, for example, one might design retainer 128, or pins 226 or 326, similarly slidably mounted within the bore of the respective housing, to be a close fit not requiring gasketing or, in the alternative, to circumferentially groove said retainer or pins so that it will accept and ride on O-rings thereon, thereby sealing the fluid within the cavity of the aforementioned housing.

It is further noted that the shape memory alloy (SMA) actuators described hereinabove may be beneficially employed to actuate devices other than the segmented nut mechanisms described herein. For example, pins 226 or 326 could be employed just to move an object with respect to housing 210 or 310, respectively, and whatever such housing might be attached to. Such actuators might also be employed so that pins 226 and 326, for example, are extended from housing 210 and 310, respectively, rather than being retracted as in the case where a separation nut mechanism 220 or 320, respectively, is employed therewith. In such case, SMA elements 250 and 270 are predeformed to be in tension and will shorten when raised to their transformation temperature, whereas SMA rod 260 thereof is predeformed to be in compression and will elongate when raised to said temperature. In similar fashion, the concentric tube actuator of separation nut 300 may also be modified so that upon activation, pin 326 is extended out of the housing 310, where outer SMA tube 350 and inner SMA rod 370 are predeformed to be compression and will elongate when raised to their transformation temperature and where inner SMA tube 360 is predeformed to be in tension and will shrink when raised to said temperature.

It is preferred that housings 110, 210 and 310 be surrounded by thermal insulating material so as to concentrate the heat generated internal to said housing upon the SMA elements therein. While a multilayer insulation system comprising 13 layers was described in relation to FIG. 1, more conventional insulation materials, such as urethane foams, fiberglass and the like may also be employed.

In addition, retaining arrangements other than the segmented nut 124 described herein may also be employed with the actuator described herein. For example, retainer 128 could be employed to move pivoted levers having lugs or fingers thereon that engage recesses or flanges on a piece to be releasably held captive, or on a piece to be captured.

Further, it is contemplated that the predeformation described herein of the SMA elements be made opposite so that the segmented nut 124 or other arrangement within mechanism 120 is actuated to grasp and capture a bolt or other workpiece inserted into cavity 123, rather than releasing such bolt or other workpiece as specifically described in relation to the exemplary embodiments herein.

What is claimed is:

1. An apparatus for releasably grasping a workpiece having graspable features thereon comprising:
   a mounting;
   a segmented grasping device having grasping features thereon and having a plurality of segments thereof mounted in movable relationship for moving together for grasping the features of the workpiece and for moving apart for releasing the workpiece;
   engaging means movable between first and second positions in relation to said segmented grasping device for respectively engaging the segments of said grasping device together when in said first position and disengaging said segments when in said second position;
   a member having a predetermined deformation from an undeformed state, said member being affixed at one location thereon to said mounting and at another location thereon to said engaging means, said member being formed of a material that returns substantially to its undeformed state when heated to a predetermined temperature; and
   means for heating said member to said predetermined temperature for causing said member to return toward said undeformed state, said return toward said undeformed state tending to move said engaging means from one of said first and second positions to the other thereof.

2. The apparatus of claim 1 wherein said member includes a rod predeformed in tension, whereby said rod shrinks when heated to a predetermined temperature.

3. The apparatus of claim 1 wherein said member is nickel titanium alloy.

4. The apparatus of claim 1 wherein said means for heating includes an electrical resistance heater affixed in substantial conformity to a surface of said member.

5. The apparatus of claim 1 wherein said segmented grasping device is a segmented nut having as said grasping features threads on a cavity therethrough.

6. The apparatus of claim 1 where said segmented grasping device has at least first and second outer portions displaced axially from each other, said first portion having a larger radial dimension than that of said second portion, and
   said engaging means has a bore therethrough in which said segmented grasping device is axially movably mounted, the bore thereof having a radial dimension that is slightly larger than the radial dimension of said first portion.

7. The apparatus of claim 1 wherein said member comprises:
   at least three shape memory alloy elements arranged substantially parallelly, first and third ones of said elements each being deformed from its undeformed state in one of compression and tension and a second one thereof intermediate said first and third ones thereof begin deformed from tis undeformed state in the other one of compression and tension, each of said elements having a first end and a second end;
   the first end of the first of said elements being affixed to said mounting, and the second end of the third of said elements being coupled to said engaging means;
   the second one of said elements being coupled at its second end to the second end of the first one of said elements and at its first end to the first end oft he third one of said elements.

8. The apparatus of claim 7 wherein said elements each have a longitudinal axis lying between its first and second ends, and said elements are arranged with their respective longitudinal axes in substantially parallel spaced-apart relationships.

9. The apparatus of claim 7 wherein said elements each have a longitudinal axis lying between its first and second ends, and said elements are arranged substantially concentrically with their respective longitudinal axes substantially collinear.

10. Apparatus for releasably grasping a threaded workpiece comprising:
    a housing;
    a segmented nut having a plurality of segments with threads on first surfaces thereof for engaging the workpiece when said segments are together, said segmented nut having first and second outer portions displaced axially form each other, said first portion having a larger radial dimension than that of said second portion;
    a nut retainer having a bore therein with a radial dimension slightly larger than that of said first outer portion of said segmented nut, said nut retainer being movably axially in relation to said segmented nut for engaging the first outer portion thereof for maintaining the segments thereof together;
    an elongated member being affixed near one end thereof to said nut retainer and near the other end thereof to said housing, said member being formed of a shape memory alloy having the property of changing from a stressed dimensions to a substantially related dimension between its ends when heated to a predetermined temperature; and
    means for heating said shape memory alloy member to reach said predetermined temperature for causing said member to return toward said related dimension for moving said nut retainer axially for disengaging the first outer portion of said segmented nut, whereby the segments of said segmented nut are not maintained together.

11. The apparatus of claim 10 wherein said segmented nut has a bevel on one end of the segments thereof, said apparatus further comprising:
    a spreader having a bevel on an end thereof proximate the beveled ends of said segments, the bevels of said segments and the bevel of said spreader being at an angle for tending to separate the segments of said segmented nut;
    urging means for urging said spreader against the beveled ends of said segments for tending to separate said segments when said nut retainer disengages the first outer portion of said segmented nut.

12. The apparatus of claim 11 wherein the bevels of the segments of said segmented nut form a concave conical surface when the segments are together, and wherein the bevel of said spreader is a convex conical surface.

13. The apparatus of claim 11 wherein said urging means comprises: a spring compressed in a direction axial with respect to said segmented nut, one end of said spring bearing on said housing, and a plunger movable axially and having a first end bearing on said spring and a second end bearing on said spreader.

14. The apparatus of claim 13 wherein said elongated member has a bore therein and said spring and said plunger are located in the bore of said member.

15. The apparatus of claim 14 further including ejecting means bearing on said workpiece when the threads of said segmented nut engage said workpiece for urging the workpiece axially out of said segmented nut, and wherein each of said spring and said plunger have an axial passage therethrough and said ejecting means is located in the passage.

16. The apparatus of claim 15 wherein said ejecting means includes an ejector rod movable axially with respect to said segmented nut, a second spring compressed in a direction axial with respect to said segmented nut, a first end of said second spring bearing on said housing and a second end thereof bearing on an end of said ejector rod distal the end thereof for urging the workpiece.

17. The apparatus of claim 10 further including ejecting means bearing on said workpiece when the threads of said segmented nut engage said workpiece for urging the workpiece axially out of said segmented nut.

18. The apparatus of claim 10 wherein said elongated member comprises:
a plurality of prestressed elements defining first and second ends, each of said prestressed elements being formed of said shape memory alloy, said plurality of elements including at least one first element which, in a direction parallel to a first axis lying between said first and second ends of said first element, has a stressed dimension which is one of greater than and less than its relaxed dimension, and at least second and third elements, each of which, in directions parallel to second and third axes lying respectively between said first and second ends of said second and third elements, respectively, have stressed dimensions which are the other one of greater than and less than their relaxed dimensions;
mechanical coupling means coupled to said first, second and third elements, for, with said first, second and third axes mutually parallel, rigidly connecting (a) said first end of said second element to said housing, (b) said second end of said second element to said first end of said first element, and (c) said second end of said first element to said first end of said third element; and wherein
said means for heating is thermally coupled to said first, second ad third elements for causing them to reach said predetermined temperature at a time when said moving said nut retainer is desired.

19. An apparatus according to claim 18 wherein said first, second and third elements are elongated in the direction of said first, second and third axes, respectively, and wherein said elements are located side-by-side with said first, second and third axes mutually parallel.

20. An apparatus according to claim 18, wherein:
said second element is elongated in the direction of said second axis and has an outer dimension;
said first element is elongated in the direction of said first axis, with an outer dimension, and with a bore having an inner dimension greater than the outer dimension of said second element;
said third element is elongated in the direction of said third axis, with a bore having an inner dimension greater than the outer dimension of said first element; and
said first, second and third axes are coaxial.

* * * * *

UNITED STATES PATENT AND TRADEMARK OFFICE
CERTIFICATE OF CORRECTION

PATENT NO. : 5,312,152

DATED : May 17, 1994

INVENTOR(S) : Woebkenberg, Jr. et al.

It is certified that error appears in the above-identified patent and that said Letters Patent is hereby corrected as shown below:

Column 11, line 63, "tis" should be --its--.
Column 12, line 5, "oft he" should be --of the--.
Column 12, line 24, "form" should be --from--.
Column 12, line 30, "movably" should be --movable--.
Column 12, line 38, "dimensions" should be --dimension--.
Column 12, line 43, "related" should be --relaxed--.
Column 14, line 16, "ad" should be --and--.

Signed and Sealed this

Eighth Day of November, 1994

BRUCE LEHMAN

Attest:

Attesting Officer

Commissioner of Patents and Trademarks